(12) United States Patent
Baudin

(10) Patent No.: US 6,257,503 B1
(45) Date of Patent: Jul. 10, 2001

(54) DISPENSER HEAD AND RECEPTACLE FITTED THEREWITH

(75) Inventor: Gilles Baudin, Domont (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/567,105

(22) Filed: May 8, 2000

(30) Foreign Application Priority Data

May 10, 1999 (FR) .................................................. 99 05918

(51) Int. Cl.⁷ .................................................. B05B 7/32
(52) U.S. Cl. ..................... 239/337; 239/463; 239/546; 222/402.1; 137/843; 137/537; 137/541
(58) Field of Search ..................... 239/333, 337, 239/546, 602, 463, 464, 533.1, 533.13, DIG. 12; 222/490, 491, 494, 495, 402.1, 402.13; 137/843, 537, 541

(56) References Cited

U.S. PATENT DOCUMENTS

| 2,913,000 | 11/1959 | Roberts . |
| 3,250,474 | 5/1966 | McKernan . |
| 3,874,563 | 4/1975 | Schwartzman . |
| 4,872,596 | 10/1989 | Corsette . |
| 5,085,353 | * 2/1992 | Inui et al. ........................ 222/402.13 |
| 5,273,191 | * 12/1993 | Meshberg .......................... 239/533.1 |
| 5,857,595 | 1/1999 | Nilson . |

FOREIGN PATENT DOCUMENTS

| 2 076 126 | 11/1981 | (GB) . |
| 2 190 465 | 11/1987 | (GB) . |

\* cited by examiner

*Primary Examiner*—Lisa Ann Douglas
(74) *Attorney, Agent, or Firm*—Oliff & Berridge, PLC.

(57) ABSTRACT

A spray head for fixing on a control rod of a valve or a pump. The spray head includes a body and a shutter disposed in a housing of the body. The housing is suitable for dispensing substance under pressure. At rest the shutter is in a closed position in which its frustoconical head portion is seated a frustoconical bearing surface of the body. The shutter moves away from the bearing surface under the pressure of the substance contained in the housing when the substance is being dispensed to form an annular dispenser orifice enabling the substance to be dispensed in the form of a hollow conical spray, at least in the vicinity of the spray head. The shutter moves away from the bearing surface against a resilient return action urging it back towards its closed position and returns to the closed position when the pressure of the substance diminishes.

13 Claims, 3 Drawing Sheets

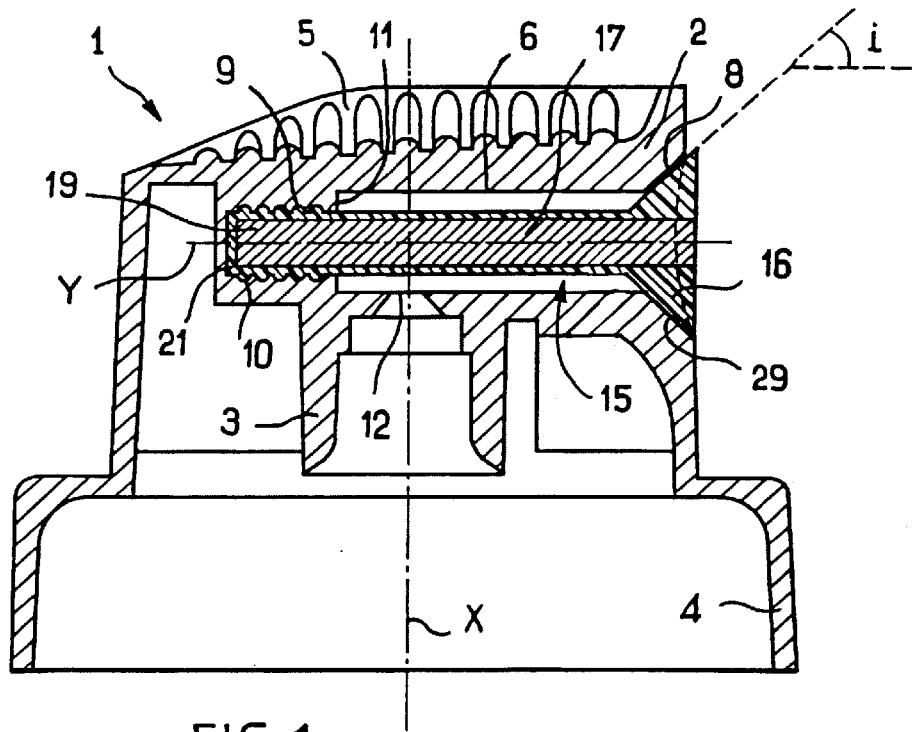
FIG_1
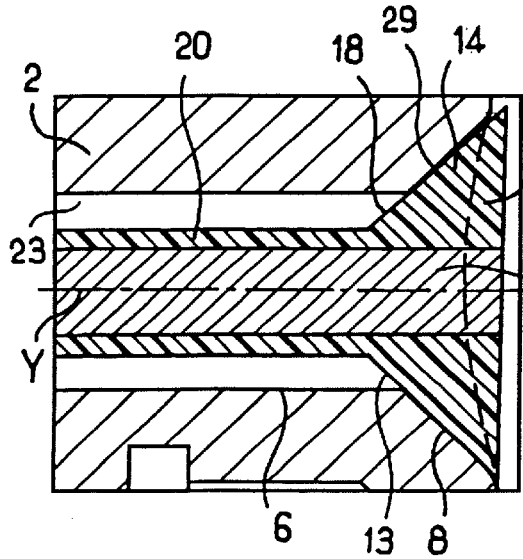
FIG_2
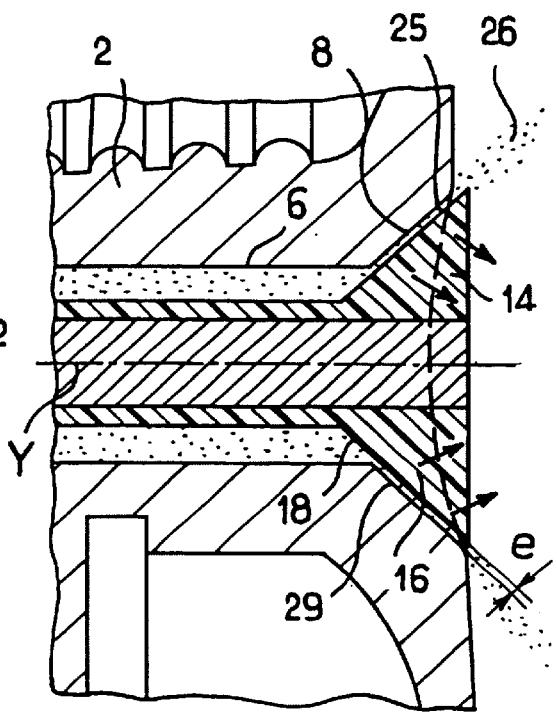
FIG_3

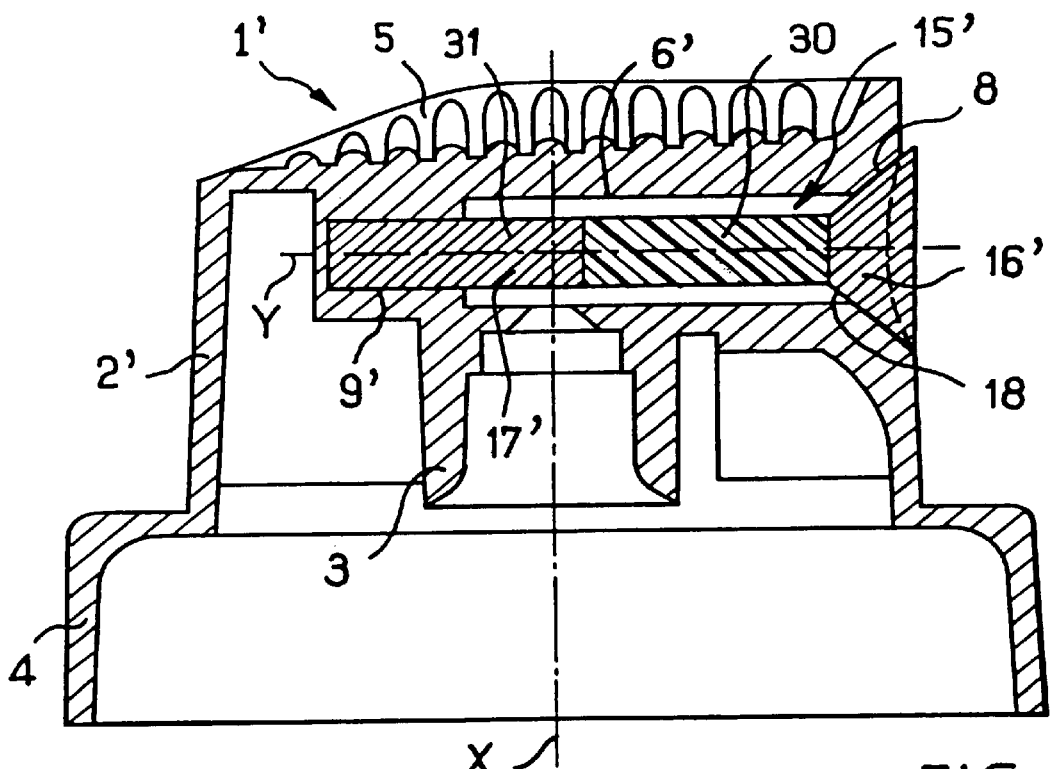
FIG_4
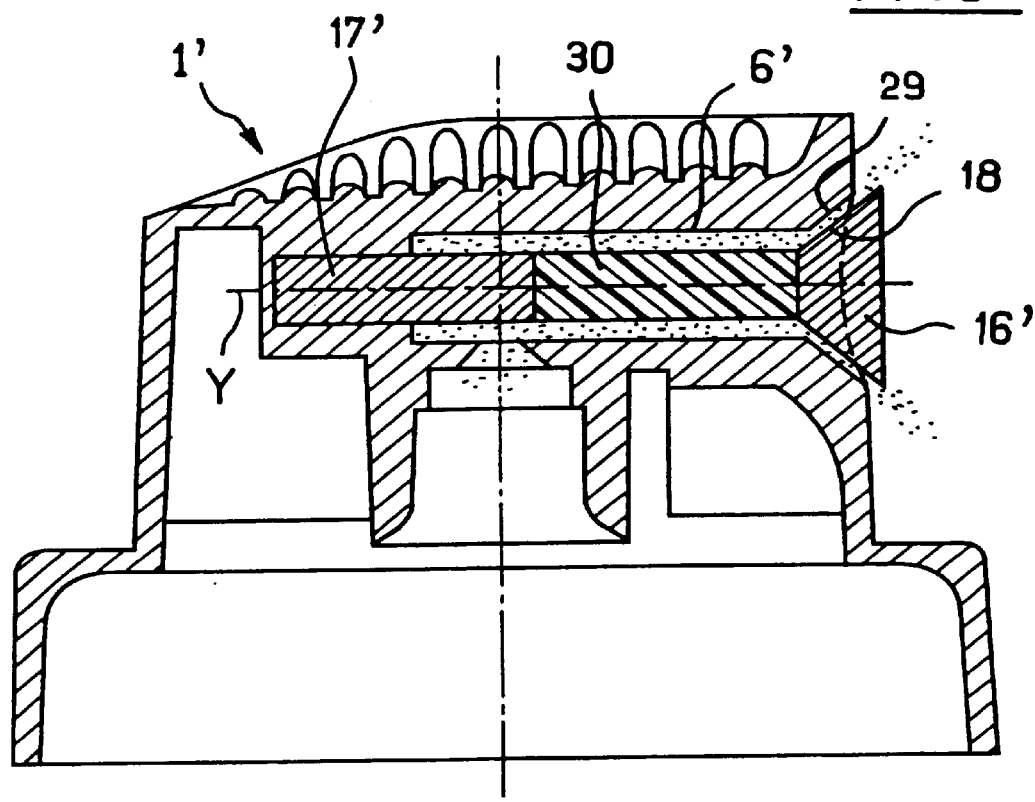
FIG_5

DISPENSER HEAD AND RECEPTACLE FITTED THEREWITH

BACKGROUND OF THE INVENTION

Dispenser heads are known in which the dispenser orifice is permanently open.

Such dispenser heads are not suitable for dispensing a substance that is liable to form a solid residue on drying out.

Proposals have therefore been made for dispenser heads in which the dispenser orifice is closed except during periods of use, so as to prevent the substance from drying out inside it.

In particular, U.S. Pat. No. 3,250,474 discloses a dispenser head having a nozzle that is capable of being displaced relative to the body of the dispenser head. The body has a pin arranged to engage in the dispenser orifice during periods of non-use.

Such a dispenser head is relatively complex to make.

In addition, for reasons of mechanical strength, the diameter of the pin must not be made too small, so the dispenser orifice needs to have a diameter that is relatively large, thereby preventing the substance being dispensed at a low flow rate.

OBJECTS AND SUMMARY OF THE INVENTION

An object of the present invention is to provide a novel spray head for fixing on a control rod of a valve or a pump, which is of relatively simple structure, and which makes it possible to avoid the substance contained inside it drying out between periods of use.

The spray head of the invention comprises a body and a shutter disposed in a housing of said body, the housing being suitable for communicating, in use, with a source of substance under pressure, the shutter being arranged at rest to take up a closed position in which it rests via a frustoconical head portion against a frustoconical bearing surface of said body, and being suitable for moving off said bearing surface under the effect of the pressure of the substance contained in said housing while dispensing the substance, thereby forming an annular dispenser orifice enabling the substance to be dispensed in the form of a hollow conical spray, at least in the vicinity of the head, the shutter moving away from said bearing surface against a resilient return action tending to urge it back into the closed position when the pressure of the substance diminishes.

The spray head of the invention is relatively simple to manufacture and the dispenser orifice is closed automatically at the end of the substance being dispensed, without the user needing to take any specific action on the dispenser head, unlike the dispenser head described in above-mentioned U.S. Pat. No. 3,250,474.

The width of the annular dispenser orifice while the substance is being dispensed is advantageously less than 0.1 mm.

The annular dispenser orifice thus opposes a relatively large amount of head loss to the flow of substance, thereby making it possible to dispense the substance at a low rate.

In addition, the resulting spray is conical and hollow, diverging away from the spray head.

Such a spray can be advantageous for dispensing certain substances compared with conventional sprays as obtained by means of a central dispenser orifice of circular section.

In a particular embodiment, the above-specified return action is obtained at least in part by elastic deformation of the frustoconical head portion of the shutter which can be made of an elastomer material, at least in its peripheral portion.

In another particular embodiment, the above-specified return action is obtained at least in part by deforming an resilient segment connecting the frustoconical head portion of the shutter to a portion that serves to fix the shutter to the body of the spray head.

In a particular embodiment, the shutter comprises a covering made of elastomer material and a central core made of a rigid plastics material.

Advantageously, the core serves to fix the covering to the body of the spray head by clamping the covering in a setback of the housing in which the shutter is placed.

Preferably, the covering has portions in relief corresponding with complementary portions in relief of the body for fixing the shutter.

In another particular embodiment, the frustoconical portion is made of a rigid plastics material.

Advantageously, the frustoconical portion is secured to a rod that has a segment of elastomer material.

Preferably, the rod also has a segment of rigid plastics material and it is advantageously fixed to the body of the spray head via said segment of rigid plastics material.

The invention also provides a receptacle fitted with such a spray head, in particular an aerosol can.

BRIEF DESCRIPTION OF THE DRAWINGS

Other characteristics and advantages of the present invention will appear on reading the following detailed description of non-limiting embodiments, and on examining the accompanying drawings, in which:

FIG. 1 is a diagrammatic axial section view of a dispenser head constituting a first embodiment of the invention;

FIG. 2 shows an implementation detail of FIG. 1;

FIG. 3 shows the shutter while the substance is being dispensed;

FIG. 4 is a diagrammatic axial section view of a dispenser head constituting a second embodiment of the invention, the shutter being shown in its closed position;

FIG. 5 is a view analogous to FIG. 4, showing the shutter while the substance is being dispensed.

MORE DETAILED DESCRIPTION

Figure 6:
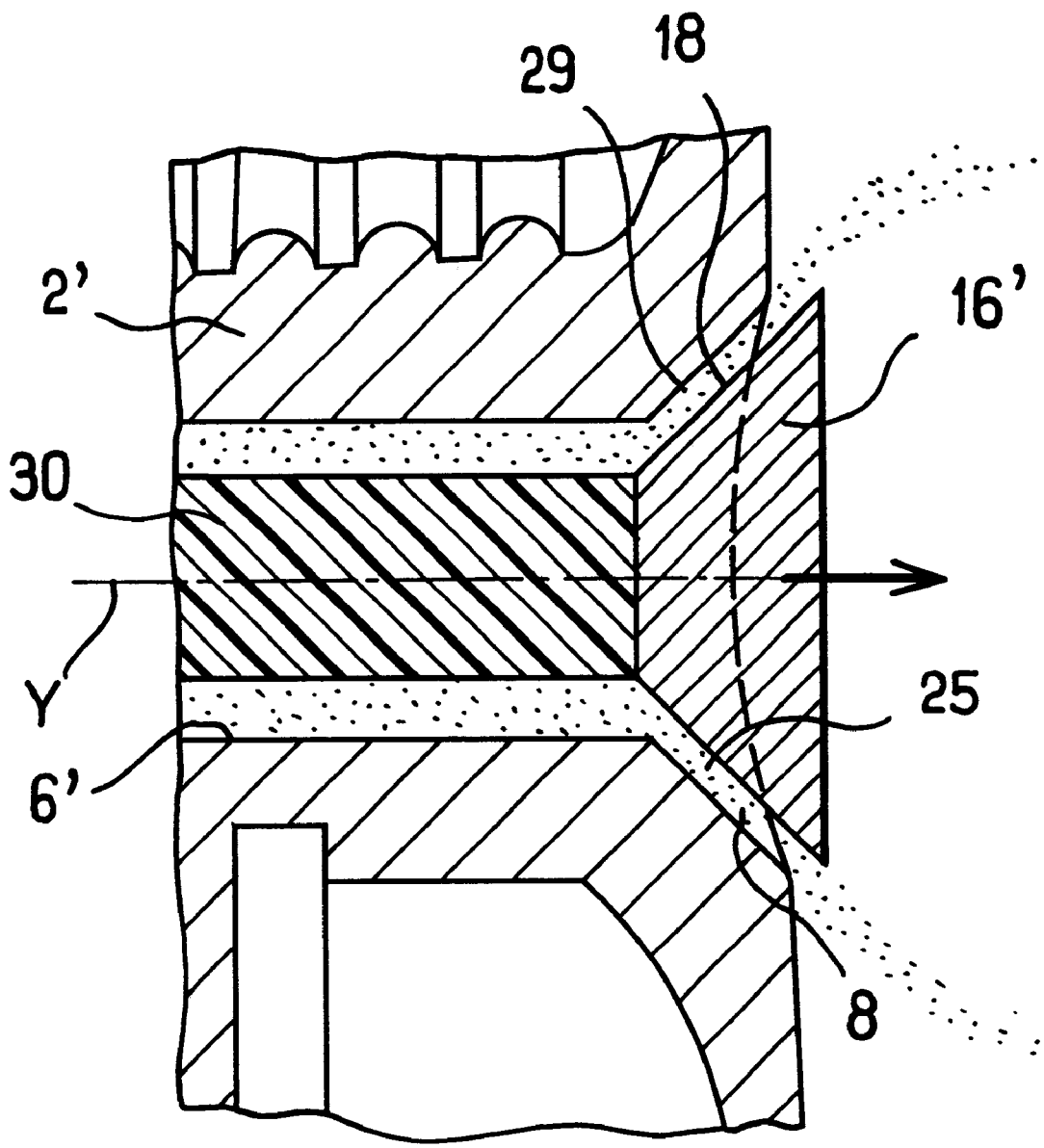
FIG. 6 is a fragmentary view on a larger scale showing a portion of FIG. 5.

The dispenser head 1 shown in FIG. 1 comprises a body 2 having an endpiece 3 for engagement on the control rod of a valve or a pump (not shown) fitted to a receptacle containing a liquid that is to be sprayed, for example a hair spray.

The bottom portion of the body 2 comprises a tubular skirt 4 for improving the appearance of the receptacle fitted with the dispenser head 1.

The endpiece 3 is circularly symmetrical about an axis X.

The dispenser head 1 has a depression 5 in its top face constituting a bearing surface for the finger of the user pressing down the dispenser head 1 to spray the substance.

The body 2 has a housing 6 on an axis Y that is perpendicular to the axis X.

This housing 6 opens out in the front face of the body 2 via an outwardly-diverging conical mouth 8.

The endpiece 3 communicates with the housing 6 via an orifice 12.

At its end opposite from its mouth 8, the housing 6 has a shoulder 11 defining the front end of a setback 9 provided with a succession of corrugations 10 whose function is explained below.

A shutter 15 is fixed to the body 2 of the dispenser head.

The shutter 15 is elongate in shape, being circularly symmetrical about the axis Y, and it comprises a substantially cylindrical rod 17 extended forwards by a frustoconical shutter head portion 16.

The rear end 19 of the rod 17 is engaged in the setback 9.

The shutter 15 has an outer covering 20 made of elastomer material.

The inside of the covering 20 is hollow starting from the front face of the shutter head 16 and extending close to the rear end face of the rod 17.

This recess enables the covering 20 to receive a central core 22 that is circularly symmetrical about the axis Y and that is made of a rigid plastics material.

The shutter head 16 thus comprises a peripheral annular portion 14 of elastomer material constituted by the front end of the covering 20, and a central portion of rigid plastics material constituted by the front end of the central core 22.

An annular space 23 is left empty around the rod 17 inside the housing 6.

Thus, the annular region 13 of the rear face 18 of the shutter head 16 adjacent to the rod 17 does not rest against the frustoconical bearing surface 29 defining the seat-forming mouth 8, and the pressure of the substance contained inside the housing 6 can bear directly against said annular region 13.

The rear end face of the rod 17 bears against the end wall 21 of the setback 9 and the portion thereof which is engaged in the setback 9 has annular ribs that co-operate with the above-mentioned corrugations 10, thereby anchoring the rod 17 in the setback 9.

Without its central core 22, the covering 20 is easy to put in place in the housing 6 for the shutter 15, merely by being inserted from the front of the housing 6.

Thereafter, inserting the central core 22 in the covering 20 serves to clamp the covering 20 inside the setback 9.

At rest, the shutter head 16 has its rear face 18 resting against the frustoconical bearing surface 29, thereby closing the housing 6 in leakproof manner, as can be seen in FIGS. 1 and 2.

When the user presses on the dispenser 1, thereby depressing the control rod on which the endpiece 3 is mounted, substance arrives under pressure and travels along the channel of the control rod into the housing 6 and exerts forwardly-directed axial stress on the shutter head 16 which then tends to move away from the frustoconical bearing surface 29, as shown in FIG. 3.

The pressure of the substance against the annular region 13 of the rear face 18 of the shutter head 16 causes the covering 20 to be deformed, thereby giving rise to annular clearance of very small width e appearing between the shutter head 16 and the body 2 of the dispenser head, this clearance being of the order of a few hundredths of a millimeter in the example described, but nevertheless being sufficient to allow an annular dispenser orifice 25 to form through which the substance can be dispensed in the form of a conical sheet 26 diverging away from the dispenser head 16.

The angle i between the conical surface 18 and the axis Y is selected as a function of the intended application.

For example, to spray a deodorant, the angle i can be selected to lie in the range 10° to 20°.

To spray a hair spray, for example, when it is desired to obtain a broad spray, the angle i can be selected to lie in the range 15° to 40°.

To spray a substance on the body, it is possible for an even larger angle i to be selected, e.g. lying in the range 40° to 60°.

For any given substance, the flow rate can be modified by acting on the pressure of the substance and on the hardness of the elastomer.

When the user ceases to press on the dispenser head 1, the shutter head 16 automatically returns to its initial configuration, thereby closing the housing 6 in leakproof manner.

This return of the shutter head 16 is due to the resilience of the material from which the covering 20 is made.

FIGS. 4 to 6 show a dispenser head 1' constituting a variant embodiment of the invention.

This dispenser head 1 has component elements that are identical to those described above.

These elements are given identical references in FIG. 4 to 6 as they are not described again in detail.

The dispenser head 1' has a body 2' which differs from the body 2 as described above merely by the fact that the setback 9' in the housing 6' does not have any corrugations 10.

The shutter 15° differs from the above-mentioned shutter 15 by the fact that the shutter head 16' which has the same shape as the shutter head 16, is made entirely out of rigid plastics material, and by the fact that the rod 17' of the shutter is constituted by an resilient segment 30 made of an elastomer material and by a segment 31 made of the same plastics material as the shutter head 16'.

The segment 31 constitutes the rear portion of the rod 17' and the resilient segment 30 connects said segments 31 to the shutter head 16'.

The shape of the rod 17' is the same as that of the rod 17, except that the segment 31 which is engages as a force-fit in the set back 9' has no annular ribs.

The rear face 18 of the shutter 16' bears at rest in leakproof manner against the frustoconical bearing surface 29.

When the user presses on the dispenser head 1' and the substance contained in the housing 6' is under pressure, the pressure of the substance against the rear face 18 of the shutter head 16' exerts axial stress along the axis Y tending to stretch the resilient segment 30.

By moving away from the frustoconical bearing surface 29, the rear face 18 forms an annular dispenser orifice 25 which enables the substance to be dispensed in the form of a conical sheet, as in the embodiment described above.

When the user releases pressure on the dispenser head 1', the control rod rises and the delivery of substance under pressure into the housing 6' ceases.

The resilient segment 30 returns the shutter head against the seat-forming surface of the body 2 and the housing 6' is isolated from the outside.

The substance contained inside the dispenser head therefore cannot dry out.

Naturally, the invention is not limited to the embodiments described above.

In particular, the shape of the shutter and the shape of the dispenser head body can be modified without going beyond the ambit of the present invention.

Specifically, other configurations can be used for the rod of the shutter or for the shutter head in order to enable the shutter to return to its closed position at rest.

What is claimed is:

1. A spray head for fixing to a control rod of a valve or a pump, the spray head comprising a body and a shutter disposed in a housing of said body, the housing being suitable for communicating, in use, with a source of substance under pressure, the shutter being arranged at rest to take up a closed position in which it rests via a frustoconical head portion against a frustoconical bearing surface of said body, and being suitable for moving off said bearing surface under the effect of the pressure of a substance contained in said housing while dispensing the substance, thereby forming an annular dispenser orifice enabling the substance to be dispensed in the form of a hollow conical spray, at least in the vicinity of the head, the shutter moving away from said bearing surface against a resilient return action tending to urge it back into the closed position when the pressure of the substance diminishes.

2. A spray head according to claim 1, wherein the return action is obtained at least in part by elastic deformation of the frustoconical head portion of the shutter.

3. A spray head according to claim 2, wherein at least the peripheral portion of the frustoconical head portion is made of an elastomer material.

4. A spray head according to claim 1, wherein the return action is obtained at least in part by deforming a resilient segment which connects the frustoconical portion of the shutter to a portion that serves to fix the shutter to the body of the spray head.

5. A spray head according to claim 1, wherein the frustoconical head portion is made of rigid plastic material.

6. A spray head according to claim 5, wherein the frustoconical head portion is secured to a rod including a segment of elastomeric material.

7. A spray head according to claim 6, wherein the rod of the shutter further has a segment of rigid plastic material, the rod being fixed to the body of the spray head by said segment of rigid plastic material.

8. A spray head according to claim 1, wherein the width of the annular dispenser orifice, while the substance is being dispensed, is less than 0.1 mm.

9. An aerosol receptacle, including a spray head as defined in claim 1.

10. A spray head according to claim 1, wherein said frustoconical head portion has a surface in contact with said bearing surface of said body when the shutter is in said closed position and wherein said surface of said frustoconical head portion diverges in a direction in which the substance is dispensed.

11. A spray head for fixing to a control rod of a valve or a pump, the spray head comprising a body and a shutter disposed in a housing of said body, the housing being suitable for communicating, in use, with a source of substance under pressure, the shutter being arranged at rest to take up a closed position in which it rests via a frustoconical head portion against a frustoconical bearing surface of said body, and being suitable for moving off said bearing surface under the effect of the pressure of a substance contained in said housing while dispensing the substance, thereby forming an annular dispenser orifice enabling the substance to be dispensed in the form of a hollow conical spray, at least in the vicinity of the head, the shutter moving away from said bearing surface against a resilient return action tending to urge it back into the closed position when the pressure of the substance diminishes, wherein the shutter includes a covering made of elastomeric material and a central core made of a rigid plastic material.

12. A spray head according to claim 11, wherein the core serves to fix the covering to the body of the spray head by clamping the covering in a setback of the housing in which the shutter is placed.

13. A spray head according to claim 12, wherein the covering has portions in relief corresponding with complementary portions in relief of the body for fixing the shutter.

* * * * *